US012444493B2

(12) United States Patent
Naoshima et al.

(10) Patent No.: US 12,444,493 B2
(45) Date of Patent: Oct. 14, 2025

(54) AMBULANCE SERVICE SUPPORT DEVICE, AMBULANCE SERVICE SUPPORT METHOD, AND PROGRAM STORAGE MEDIUM

(71) Applicant: NEC Corporation, Tokyo (JP)

(72) Inventors: Hiroki Naoshima, Tokyo (JP); Hironori Nakata, Tokyo (JP); Eiji Takada, Tokyo (JP); Yuji Takagi, Tokyo (JP); Yuri Mashimo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 218 days.

(21) Appl. No.: 17/563,290

(22) Filed: Dec. 28, 2021

(65) Prior Publication Data
US 2022/0223267 A1    Jul. 14, 2022

(30) Foreign Application Priority Data

Jan. 8, 2021    (JP) .................... 2021-001788

(51) Int. Cl.
*G16H 40/20*    (2018.01)
*G06V 40/16*    (2022.01)
*G16H 10/60*    (2018.01)
*G16H 40/67*    (2018.01)

(52) U.S. Cl.
CPC ........... *G16H 40/20* (2018.01); *G06V 40/172* (2022.01); *G16H 10/60* (2018.01); *G16H 40/67* (2018.01)

(58) Field of Classification Search
CPC ........ G16H 40/20; G16H 10/60; G16H 40/67; G06V 40/172
See application file for complete search history.

(56) References Cited

U.S. PATENT DOCUMENTS

| | | | |
|---|---|---|---|
| 10,490,305 B1* | 11/2019 | Kocher | G16H 40/67 |
| 2009/0136094 A1* | 5/2009 | Driver | G16H 10/60 |
| | | | 382/115 |
| 2013/0054265 A1* | 2/2013 | Warner | G16H 40/20 |
| | | | 705/3 |

(Continued)

FOREIGN PATENT DOCUMENTS

| | | | |
|---|---|---|---|
| JP | 2004171394 A | * | 6/2004 |
| JP | 2007-128245 A | | 5/2007 |

(Continued)

OTHER PUBLICATIONS

JP2004171394A English Machine Translation (Year: 2004).*

(Continued)

*Primary Examiner* — Mamon Obeid
*Assistant Examiner* — Malak M Nasser
(74) *Attorney, Agent, or Firm* — Sughrue Mion, PLLC (57) ABSTRACT

An ambulance service support device receives biological information to be used for personal identification of a person to be transported. The ambulance service support device identifies, using a database storing personal medical information, the personal medical information of the person to be transported by using the acquired biological information. The personal medical information is personal information regarding medical care including the biological information. The ambulance service support device outputs emergency support information obtained from the identified personal medical information.

8 Claims, 10 Drawing Sheets

(56) References Cited

U.S. PATENT DOCUMENTS

| | | | |
|---|---|---|---|
| 2013/0096649 A1 | 4/2013 | Martin et al. | |
| 2014/0025394 A1 | 1/2014 | Aoki et al. | |
| 2015/0106118 A1* | 4/2015 | Melo | G16H 10/65 705/3 |
| 2015/0363574 A1* | 12/2015 | Takao | G16H 10/60 705/3 |
| 2018/0029553 A1* | 2/2018 | Hamakami | G08B 25/08 |
| 2020/0258606 A1 | 8/2020 | Ferentz et al. | |
| 2021/0042505 A1* | 2/2021 | Dintakurty | G16H 10/60 |

FOREIGN PATENT DOCUMENTS

| | | | |
|---|---|---|---|
| JP | 2010039978 A * | 2/2010 | |
| JP | 2011-180645 A | 9/2011 | |
| JP | 2012-256281 A | 12/2012 | |
| JP | 2014-236228 A | 12/2014 | |
| JP | 2019-021179 A | 2/2019 | |
| JP | 2019028911 A * | 2/2019 | |
| JP | 2019-185077 A | 10/2019 | |
| JP | 2020149215 A * | 9/2020 | |
| JP | 2020173557 A * | 10/2020 | |
| JP | 2020-204924 A | 12/2020 | |
| KR | 100800026 B1 * | 2/2008 | |
| KR | 20210054978 A * | 5/2021 | |
| WO | 2019/198358 A1 | 10/2019 | |

OTHER PUBLICATIONS

JP2020149215A English Machine Translation (Year: 2020).*
JP2010039978A English Translation (Year: 2010).*
JP2004171394A English Translation (Year: 2004).*
JP Office Action for JP Application No. 2021-001788, mailed on May 28, 2024 with English Translation.
US Office Action for U.S. Appl. No. 18/515,727, mailed on Jul. 29, 2024.
JP Office Action for JP Application No. 2021-001788, mailed on Oct. 29, 2024 with English Translation.
US Office Action for U.S. Appl. No. 18/515,727, mailed on Nov. 7, 2024.
JP Office Communication for JP Application No. 2021-001788, mailed on Mar. 18, 2025 with English Translation.
US Office Action for U.S. Appl. No. 18/511,269, mailed on Nov. 21, 2024.

* cited by examiner

AMBULANCE SERVICE SUPPORT DEVICE, AMBULANCE SERVICE SUPPORT METHOD, AND PROGRAM STORAGE MEDIUM

This application is based upon and claims the benefit of priority from Japanese Patent Application No. 2021-001788, filed on Jan. 8, 2021, the disclosure of which is incorporated herein in its entirety by reference.

TECHNICAL FIELD

The present invention relates to a technology for supporting an ambulance crew at an emergency transport site.

BACKGROUND ART

At an emergency transport site, in some cases, it is difficult for an ambulance crew to acquire useful information, such as an identity of a person to be transported (sick and injured person), his/her regular hospital, whether he/she has a chronic disease and takes chronic medicine, and his/her medical history, at the time of transport because, for example, the person to be transported is unconscious. In such a case, because there is no or little information regarding the disease of the person to be transported, the ambulance crew may not be able to determine which treatment to give the person to be transported or which hospital to transport the person.

Reference Literature 1 (WO 2019/198358 A) discloses a technology for collecting personal medical information in a plurality of medical institutions to a collection server of a management center and managing the information. According to the technology disclosed in Reference Literature 1, for example, it is possible to acquire medical information of a person to be transported from the collection server in an ambulance by using identification information (patient number) of the person to be transported and use the medical information, thereby improving a lifesaving rate.

According to the technology disclosed in Reference Literature 1, in order to acquire the medical information of the person to be transported (medical examinee) from the collection server, it is essential to input identification information (information represented by characters or numbers) of the person to be transported. Therefore, if the person to be transported forgets the identification information, it is difficult to acquire the medical information from the collection server. Further, if a note on which the identification information (information represented by characters or numbers) is written or an object that holds the identification information is lost, the medical information may be leaked.

Reference Literature 1 describes a case where the identification information cannot be obtained from the medical examinee because, for example, the medical examinee is in poor physical condition. According to the technology disclosed in Reference Literature 1, it is essential to input the identification information in order to acquire the medical information from the collection server, and therefore, in a case where the identification information cannot be obtained from the medical examinee, the identification information needs to be acquired from a person other than the medical examinee. In such a case, it takes time and effort for the ambulance crew to acquire the identification information from a person other than the medical examinee.

SUMMARY

In order to solve the above problems, as an example aspect of an ambulance service support device according to the present invention, the ambulance service support device includes a processor configured to:
- receive biological information of a person to be transported from an acquisition device, the biological information being an information to be used for personal identification, the acquisition device being a device that acquires the biological information from the person to be transported;
- identify, using a database storing personal medical information, the personal medical information of the person to be transported by using the acquired biological information, the personal medical information being personal information regarding medical care including the biological information; and
- transmit emergency support information obtained from the identified personal medical information to a notification device.

Further, as an example aspect of an ambulance service support method according to the present invention, the ambulance service support method causes
a computer to:
- receive biological information of a person to be transported from an acquisition device, the biological information being an information to be used for personal identification, the acquisition device being a device that acquires the biological information from the person to be transported;
- identify, using a database storing personal medical information, the personal medical information of the person to be transported by using the acquired biological information, the personal medical information being personal information regarding medical care including the biological information; and
- transmit emergency support information obtained from the identified personal medical information to a notification device.

Furthermore, as an example aspect of a program storage medium according to the present invention, the program storage medium stores a computer program for causing a computer to execute processing of:
- receiving biological information of a person to be transported from an acquisition device, the biological information being an information to be used for personal identification, the acquisition device being a device that acquires the biological information from the person to be transported;
- identifying, using a database storing personal medical information, the personal medical information of the person to be transported by using the acquired biological information, the personal medical information being personal information regarding medical care including the biological information; and
- transmitting emergency support information obtained from the identified personal medical information to a notification device.

BRIEF DESCRIPTION OF THE DRAWINGS

Exemplary features and advantages of the present invention will become apparent from the following detailed description when taken with the accompanying drawings in which.

EXAMPLE EMBODIMENT

Hereinafter, example embodiments according to the present invention will be described with reference to the drawings.

First Example Embodiment

Figure 1:
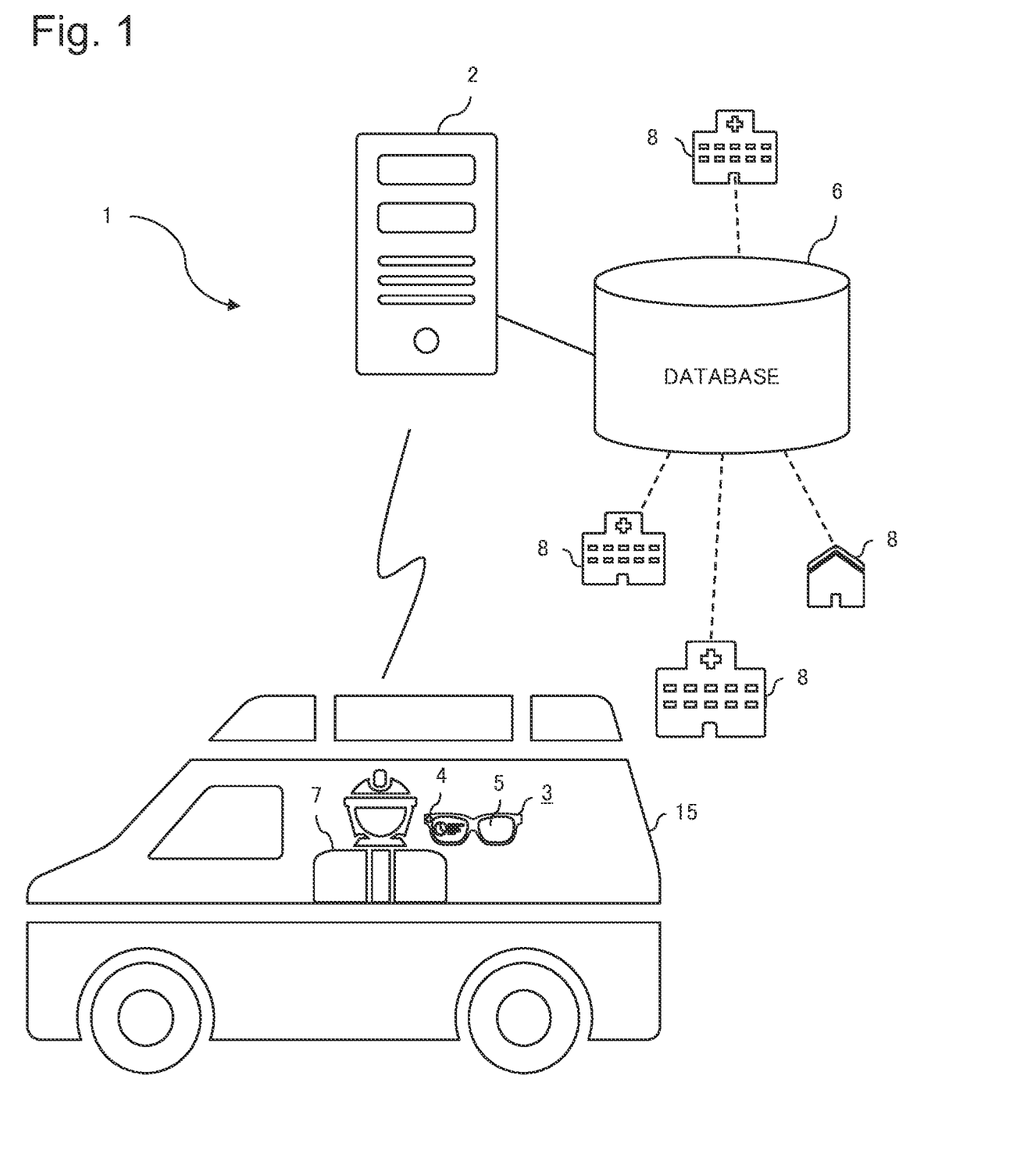
FIG. 1 schematically illustrates an ambulance service support system according to a first example embodiment.

FIG. 1 schematically illustrates an ambulance service support system according to a first example embodiment of the present invention. An ambulance service support system 1 according to the first example embodiment is a system that supports an ambulance crew 7 by providing information on medical care of a person to be transported (sick and injured person) at an emergency transport site. That is, in the ambulance service support system 1, for example, an image of a face that is biological information of the person to be transported is captured by the ambulance crew 7 by using a camera provided in smart glasses 3 that are a wearable device, and the captured face image is transmitted to an ambulance service support device 2. The ambulance service support device 2 identifies personal medical information of the person to be transported in a database 6 by using the received face image and returns emergency support information based on the identified personal medical information to a sender of the face image. Therefore, for example, the emergency support information is displayed on a display device that is a notification device provided in the smart glasses 3.

The personal medical information stored in the database 6 is information on medical care of a person and includes not only basic information such as a name, a date of birth, and an address but also medical information obtained when a medical institution such as a hospital or pharmacy is used. The medical information includes information known by a medical worker, such as a name of his/her regular medical institution, a name of a doctor in charge, whether he/she has a chronic disease or takes chronic medicine, his/her medical history, whether he/she has allergies, and whether he/she has a mental disorder. The personal medical information may further include information on an intention of becoming an organ donor or information on an intention of receiving life-prolonging treatments.

The personal medical information also includes biological information that can be used for personal identification. Examples of the biological information that can be used for personal identification include a plurality of pieces of biological information such as a face, fingerprint, iris, vein, palm print, and ear shape. One or a plurality of pieces of biological information may be appropriately selected from those pieces of biological information and may be included in the personal medical information. In the first example embodiment, the personal medical information in the database 6 is searched for by using the biological information, and therefore the biological information is included in the personal medical information in consideration of this. That is, the biological information of the person to be transported is acquired in order to obtain the personal medical information at an emergency transport site, and therefore, in consideration of easiness of acquiring the biological information at this time, an image of a face (face image) is included in the personal medical information as the biological information.

In order to acquire the image of the face that is the biological information included in the personal medical information described above, an imaging device (camera) is used as described above as an acquisition device that acquires the biological information from the person to be transported. Herein, the smart glasses 3 are provided with an imaging device 4, and this makes it possible to improve a degree of freedom of action of the ambulance crew 7, as compared with a case where the ambulance crew 7 operates the imaging device with his/her hands. The display device serving as the notification device that makes notification of the emergency support information transmitted from the ambulance service support device 2 is also provided in the same smart glasses 3 as the imaging device. Therefore, the ambulance crew 7 can view the emergency support information while seeing a state of the person to be transported through the smart glasses 3. Thus, it is unnecessary to take his/her eyes off the person to be transported and see a screen of the display device in order to view the emergency support information.

The emergency support information transmitted from the ambulance service support device 2 is information based on the personal medical information in the database 6, and information assumed to be effective for the ambulance crew 7 at an emergency transport site is selected in advance from the personal medical information and is included in the emergency support information. Specific examples of the information included in the emergency support information include basic information such as a name, a date of birth, and an address and information such as whether the person to be transported has allergies, whether he/she has a disease under treatment, whether he/she has a mental disorder, a chronic disease, and chronic medicine.

Figure 2:
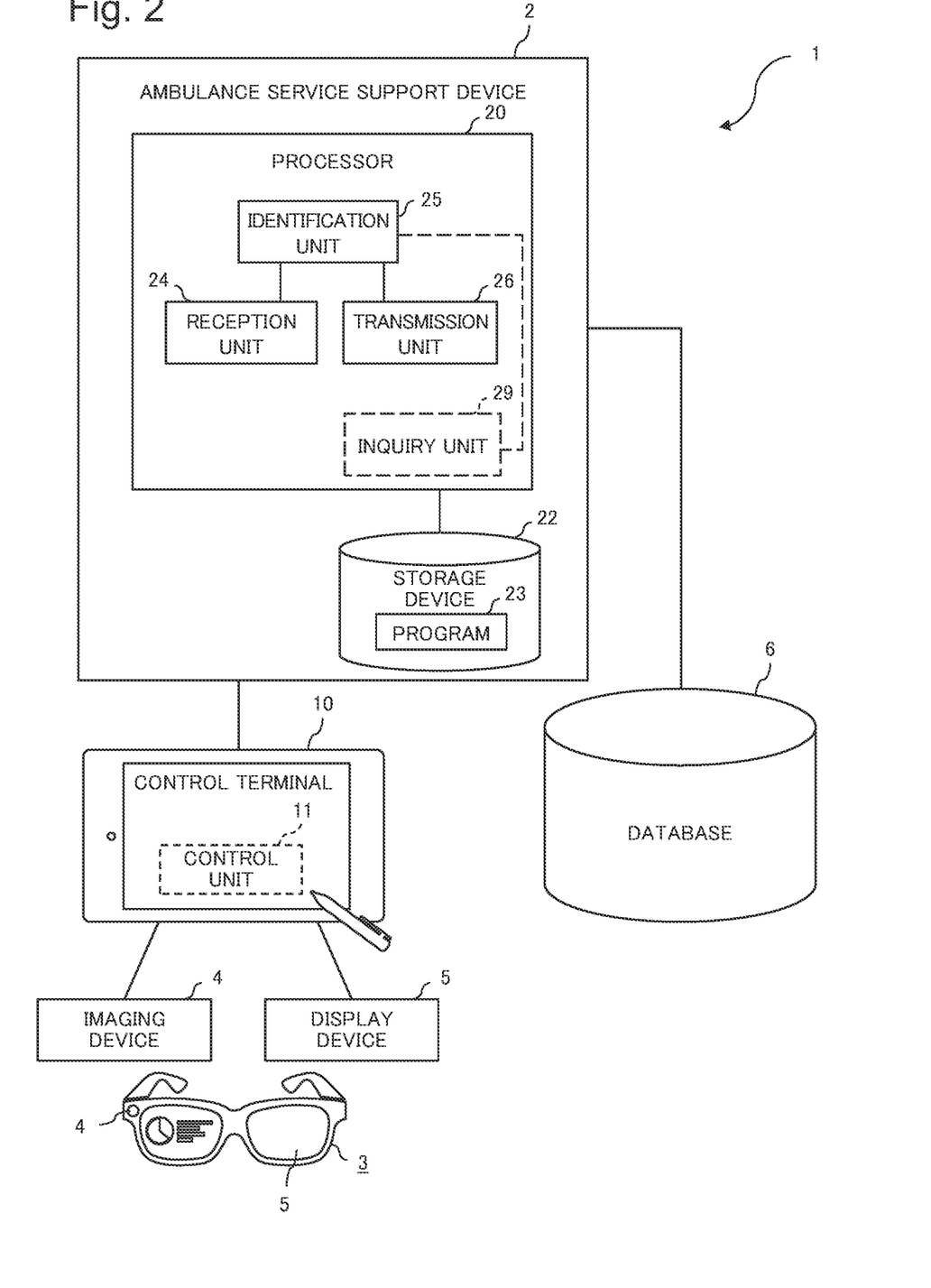
FIG. 2 is a block diagram illustrating a configuration of the ambulance service support system according to the first example embodiment.

Hereinafter, a configuration of the ambulance service support system 1 according to the first example embodiment will be described in detail. FIG. 2 is a block diagram illustrating a configuration of the ambulance service support system 1 according to the first example embodiment. The ambulance service support system 1 of the first example embodiment includes the ambulance service support device 2, the imaging device (acquisition device) 4, and a display device (notification device) 5.

In the first example embodiment, the imaging device 4 and the display device 5 are provided in the smart glasses 3 as described above. The imaging device 4 and the display device 5 are connected to a control terminal 10 by, for example, wireless communication and are controlled by the control terminal 10. The control terminal 10 is, for example, a computer device that can be carried by the ambulance crew 7 or is installed in an ambulance 15 on which the ambulance crew 7 rides and is connected to the ambulance service support device 2 via, for example, an information communication network.

The control terminal 10 includes a control unit 11 including a processor such as a central processing unit (CPU). Operation of the imaging device 4 and the display device 5 is controlled by the control unit 11. For example, upon receipt of an image capturing instruction in a state in which the imaging device 4 can capture a face image of the person to be transported, the control unit 11 causes the imaging device 4 to execute an image capturing operation. Therefore, the imaging device 4 captures the face image of the person to be transported. Further, the control unit 11 transmits the image captured by the imaging device 4 to the ambulance service support device 2. At this time, in a case where the captured image including the face image obtained by the imaging device 4 is transmitted to the ambulance service support device 2 in order to obtain the emergency support information, the control unit 11 also transmits, for example, an instruction to request the emergency support information. Further, upon receipt of notification information indicating contents of notification from the ambulance service support device 2, the control unit 11 causes the display device 5 to display the received notification information. One piece of the notification information is the emergency support information described above.

There are various configurations of the smart glasses 3, and there are various methods of controlling the imaging device 4 and the display device 5. The configuration of the smart glasses 3 and the methods of controlling the imaging device 4 and the display device 5 are not particularly limited herein, and description thereof is omitted. The control unit 11 may have a voice recognition function, i.e., may analyze an audio signal from a microphone provided in the control terminal 10 or the smart glasses 3, recognize an instruction issued from the ambulance crew 7, and control an operation in accordance with the instruction. For example, in a case where the control unit 11 recognizes a voice instruction to "capture an image of his/her face" from the ambulance crew 7, the control unit 11 determines that an image capturing instruction has been received and causes the imaging device 4 to execute an image capturing operation. In a case where the control unit 11 recognizes a voice instruction to "display the captured image" from the ambulance crew 7, the control unit 11 causes the display device 5 to display the captured image obtained by the imaging device 4. In a case where the control unit 11 recognizes a voice instruction to "transmit the captured image" from the ambulance crew 7, the control unit 11 transmits the captured image obtained by the imaging device 4 to the ambulance service support device 2. In a case where the control unit 11 recognizes a voice instruction to "display his/her name" from the ambulance crew 7 after the captured image is transmitted, the control unit 11 causes the display device 5 to display information on the name from the information included in the emergency support information received from the ambulance service support device 2.

The ambulance service support device 2 is a computer device (e.g., server). The ambulance service support device 2 is connected to the database 6 and can read the personal medical information stored in the database 6. In a case where information on a treatment performed on the person to be transported is input, the ambulance service support device 2 can add the input information to the personal medical information of the person to be transported in the database 6. The ambulance service support device 2 is connected to the imaging device 4 and the display device 5 via the control terminal 10 as described above.

The ambulance service support device 2 includes a processor 20 and a storage device 22. The storage device 22 includes a storage medium that stores data and a program 23. There are various kinds of storage devices. Specifically, there are multiple kinds of storage devices such as a magnetic disk device and a semiconductor memory element, and there are multiple kinds of semiconductor memory elements such as a random access memory (RAM) and a read only memory (ROM). The kind of the storage device 22 included in the ambulance service support device 2 is not limited to one, and multiple kinds of storage devices 22 are included in the ambulance service support device 2 in many cases. The kind and number of the storage devices 22 provided in the ambulance service support device 2 are not limited herein, and description thereof is omitted. In a case where multiple kinds of storage devices 22 are included in the ambulance service support device 2, those storage devices will be collectively referred to as the storage device 22.

The processor 20 illustrated in FIG. 2 includes, for example, one or a plurality of processors such as a central processing unit (CPU) and a graphics processing unit (GPU). The processor 20 reads and executes the program 23 stored in the storage device 22 and can therefore have various functions based on the program 23. In the first example embodiment, the processor 20 includes a reception unit 24, an identification unit 25, and a transmission unit 26 as functional units.

The reception unit 24 receives the captured image captured by the imaging device 4. The reception unit 24 stores information on the captured image in the storage device 22.

In a case where the identification unit 25 receives an instruction to request the emergency support information from the control terminal 10 and the captured image received by the reception unit 24 includes an image of the face that is the biological information of the person to be transported, the identification unit 25 searches the database 6 by using the image of the face as a search key. Then, the identification unit 25 identifies, in the database 6, the personal medical information including a face image matching with the image of the face serving as the search key. There are various methods of extracting a face image from a captured image, such as a method using a face pattern. Herein, an appropriate method is adopted in consideration of a throughput of the ambulance service support device 2, a resolution of the captured image transmitted from the imaging device 4, or the like. A method of searching for (identifying) the personal medical information in the database 6 by using the image of the face as the search key is not particularly limited, and examples thereof include the following methods. For example, the identification unit 25 may directly search for the personal medical information by using the image of the face as the search key or may search for the personal medical information as follows. For example, data of face images associated with personal identifications (IDs) is stored in the database 6, and personal medical information relevant to the face images are also associated with the same personal IDs. The identification unit 25 acquires a personal ID associated with data of a face image having high similarity to the image of the face serving as the search key and searches for (identifies) personal medical information relevant to the image of the face serving as the search key by using the acquired personal ID.

The transmission unit 26 returns the emergency support information based on the personal medical information identified by the identification unit 25 to the control terminal 10 that has transmitted the image of the face used to search for the personal medical information. The emergency support information is information for supporting the ambulance crew 7 and, as described above, includes information assumed to be effective for the ambulance crew 7 at an emergency transport site among pieces of the personal medical information.

Figure 3:
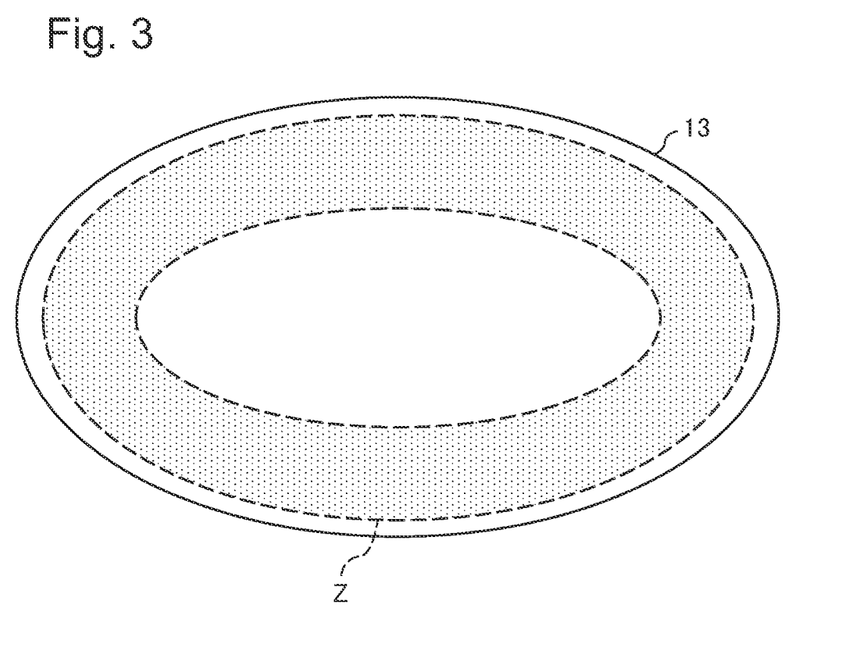
FIG. 3 is an explanatory diagram of an information display area by a display device.

In the first example embodiment, the emergency support information is displayed by the display device 5 of the smart glasses 3 in an information display area Z in a visual field 13 obtained in a case where the ambulance crew 7 looks straight forward as illustrated in FIG. 3. The information display area Z is set to a visual field portion that does not interrupt an activity of the ambulance crew 7 wearing the smart glasses 3. The emergency support information is displayed in the information display area Z by using characters, marks, and symbols, and the size of the characters, marks, and symbols is set so that the information is clearly transmitted to the ambulance crew 7. An amount of information that can be displayed in the information display area Z at one time is limited depending on the size of the characters, marks, and symbols set as described above. Therefore, in the first example embodiment, a plurality of pieces of information included in the emergency support information transmitted from the transmission unit 26 is associated with information on priority regarding display. Alternatively, relationship data between the plurality of pieces of information included in the emergency support information and priority regarding display of the information is given to the control terminal 10.

The control terminal 10 that has received the emergency support information from the transmission unit 26 causes the display device 5 to display pieces of information among the plurality of pieces of information included in the received emergency support information in descending order of priority in a predetermined display mode. The information displayed by the display device 5 is not limited to one by one, and a plurality of pieces of information may be displayed in parallel.

Figure 4:
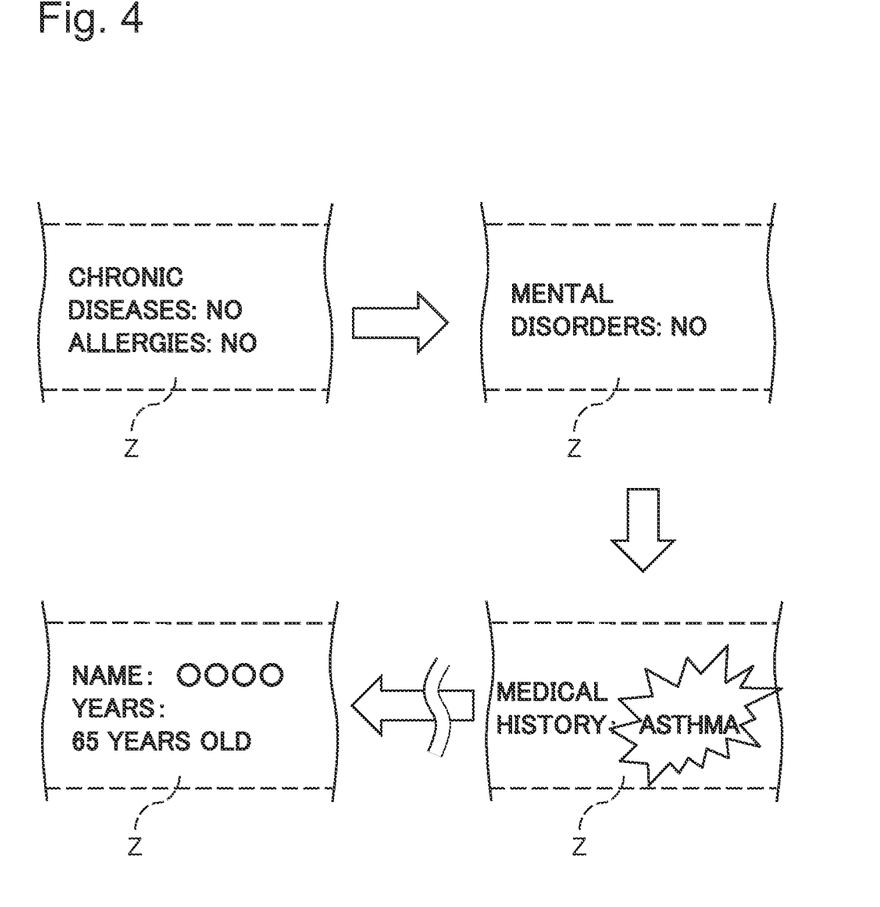
FIG. 4 is an explanatory diagram of a display control example by the display device.

FIG. 4 illustrates an example of the emergency support information displayed by the display device 5. In the example of FIG. 4, as described above, pieces of information among the plurality of pieces of information included in the emergency support information are displayed by the display device 5 in descending order of priority of display. Information of which the ambulance crew 7 should be notified in particular is highlighted.

Figure 5:
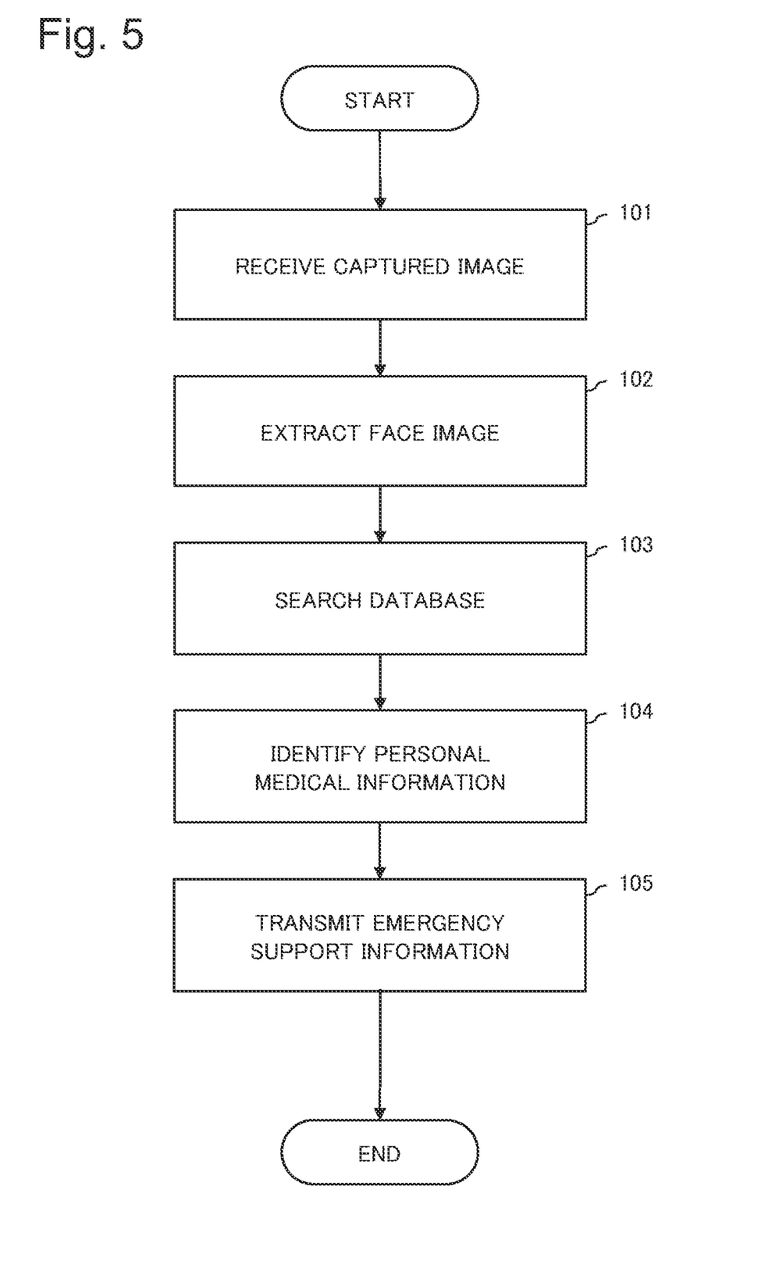
FIG. 5 is a flowchart showing an operation example of an ambulance service support device included in the ambulance service support system according to the first example embodiment.

The ambulance service support system 1 and the ambulance service support device 2 according to the first example embodiment are configured as described above. Next, an operation example where the ambulance service support device 2 provides (makes notification of) the emergency support information will be described with reference to FIG. 5. FIG. 5 is a flowchart showing an operation example where the ambulance service support device 2 provides (makes notification of) the emergency support information.

For example, when the reception unit 24 of the ambulance service support device 2 receives a captured image obtained by the imaging device 4 and an instruction to request emergency support information from the control terminal 10 (step 101 in FIG. 5), the identification unit 25 extracts an image of a face (face image) from the captured image (step 102). Thereafter, the identification unit 25 searches the database 6 by using the extracted face image as a search key (step 103). Therefore, the identification unit 25 identifies personal medical information including a face image matching with the face image serving as the search key (step 104). Then, the transmission unit 26 transmits (returns) emergency support information based on the identified personal medical information to the control terminal 10 that has requested the emergency support information (step 105).

The control terminal 10 that has received the emergency support information transmitted as described above notifies (provides) the ambulance crew 7 of (with) the emergency support information by controlling a display operation of the display device 5.

The ambulance service support system 1 and the ambulance service support device 2 according to the first example embodiment can provide the ambulance crew 7 with the emergency support information based on the personal medical information by using the face image of the person to be transported captured at an emergency transport site. Therefore, even in a case where information useful for emergency transport cannot be obtained from the person to be transported, the ambulance crew 7 can easily obtain the emergency support information based on the personal medical information by capturing the face image and transmitting the face image to the ambulance service support device 2.

The ambulance service support system 1 and the ambulance service support device 2 identify the personal medical information of the person to be transported in the database 6 by using the face image, instead of using the identification information (information represented by characters or numbers) of the personal medical information. Therefore, the ambulance service support system 1 and the ambulance service support device 2 can avoid a problem of an increase in time and effort of the ambulance crew 7 caused by identifying the personal medical information by using the identification information (information represented by characters or numbers) and can also avoid a concern of information leakage.

That is, even in a situation in which information cannot be obtained from the person to be transported at an emergency transport site, the ambulance service support system 1 and the ambulance service support device 2 can present the medical information of the person to be transported effective for the ambulance crew 7, without increasing time and effort of the ambulance crew 7.

In the first example embodiment, the display device 5 is provided in the ambulance service support system 1 as the notification device. However, in addition to the display device 5, a voice notification device that makes notification of the emergency support information with voice may also be provided as the notification device. Further, in a case where the personal medical information in the database 6 includes information on an intention of becoming an organ donor or an intention of receiving life-prolonging treatments, such information may also be transmitted from the ambulance service support device 2 to the control terminal 10 as information included in the emergency support information.

Second Example Embodiment

Hereinafter, a second example embodiment according to the present invention will be described. In description of the second example embodiment, portions having the same names as the names used in the description of the ambulance service support system 1 and the ambulance service support device 2 according to the first example embodiment are denoted by the same reference signs, and repeated description of the same portions will be omitted.

Figure 6:
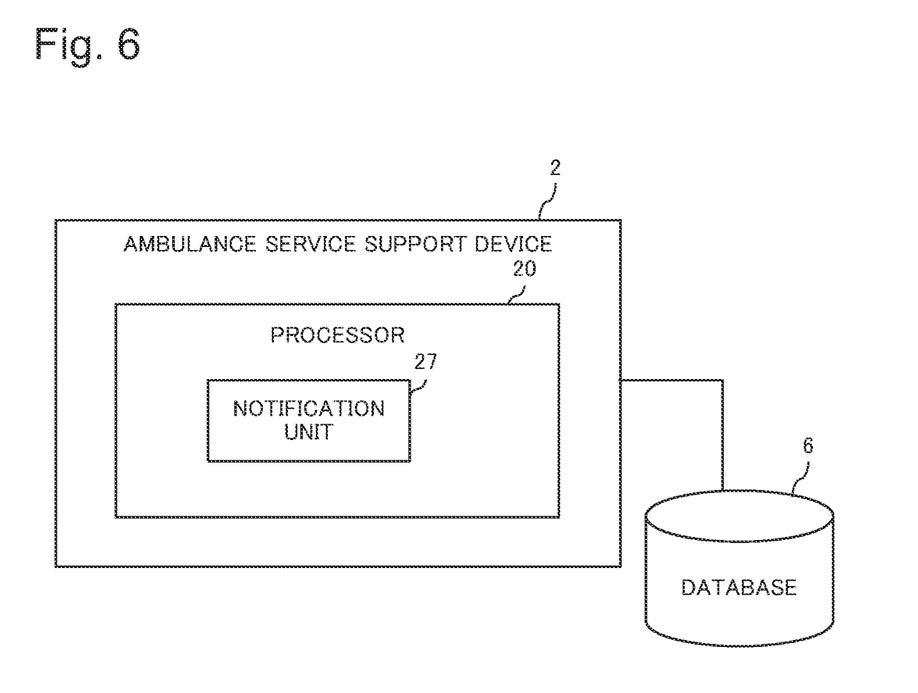
FIG. 6 is a block diagram illustrating a configuration of an ambulance service support device according to a second example embodiment.

In the second example embodiment, the ambulance service support device 2 includes a notification unit 27 as illustrated in FIG. 6 in addition to the configuration of the first example embodiment. The personal medical information in the database 6 includes an email address that is information on an emergency contact destination or information relevant to the email address. Examples of the information relevant to the email address include contact information in a short message service (SMS) and contact information in a communication application. FIG. 6 omits illustration of the storage device 22 and the reception unit 24, the identification unit 25, and the transmission unit 26 of the processor 20 in the ambulance service support device 2.

The notification unit 27, as well as the reception unit 24, the identification unit 25, and the transmission unit 26, is one of functional units achieved by the processor 20 by the processor 20 executing a program regarding the notification unit 27. Upon receipt of an instruction to contact an emergency contact destination, the notification unit 27 transmits a notification to notify the emergency contact destination of a state of a person to be transported. The instruction to contact the emergency contact destination is issued, for example, from the control terminal 10 by an operation of the ambulance crew 7. At this time, for example, information such as a name of a medical institution to which the person to be transported is transported is output from the control terminal 10. The notification unit 27 transmits a notification using a fixed phrase that tells the state of the person to be transported, such as "Mr./Ms. ○○○ has been transported to the △△△△ hospital. Contact information of the △△△△ hospital is *-*-**.", to the emergency contact destination included in the personal medical information of the person to be transported. The configurations other than the above in the ambulance service support system 1 and the ambulance service support device 2** of the second example embodiment are similar to those of the first example embodiment, and description thereof is omitted herein.

The ambulance service support system 1 and the ambulance service support device 2 of the second example embodiment have similar configurations to those of the first example embodiment and can therefore have a similar effect to that of the first example embodiment. The ambulance service support device 2 of the second example embodiment includes the notification unit 27 and can therefore transmit a notification that tells the state of the person to be transported to the emergency contact destination of the person to be transported.

Third Example Embodiment

Hereinafter, a third example embodiment according to the present invention will be described. In description of the third example embodiment, portions having the same names as the names used in the description of the ambulance service support system 1 and the ambulance service support device 2 according to the first or second example embodiment are denoted by the same reference signs, and repeated description of the same portions will be omitted.

Figure 7:
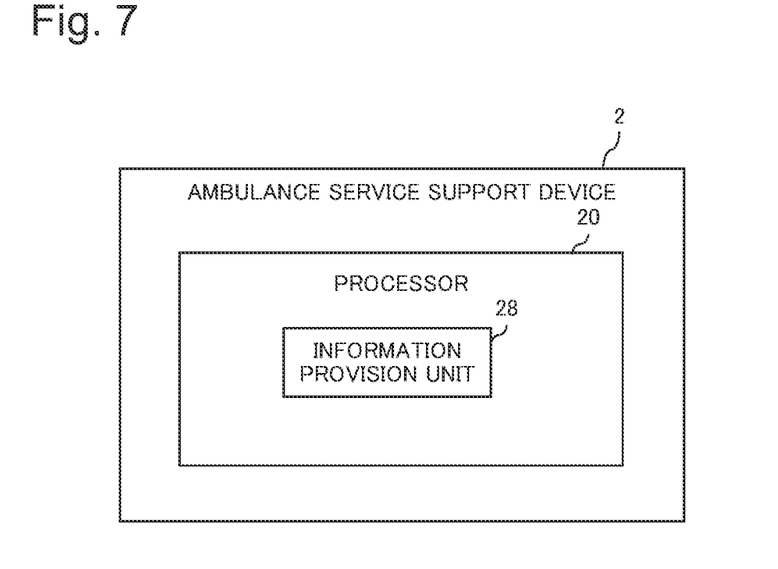
FIG. 7 is a block diagram illustrating a configuration of an ambulance service support device according to a third example embodiment.

In the third example embodiment, the ambulance service support device 2 includes an information provision unit 28 as illustrated in FIG. 7 in addition to the configuration of the first or second example embodiment. FIG. 7 omits illustration of the storage device 22 and the reception unit 24, the identification unit 25, and the transmission unit 26 of the processor 20 in the ambulance service support device 2.

The information provision unit 28, as well as the reception unit 24, the identification unit 25, and the transmission unit 26, is one of functional units achieved by the processor 20 by the processor 20 executing a program regarding the information provision unit 28. Upon receipt of transport destination information indicating a transport destination of the person to be transported, the information provision unit 28 transmits the image of the face that is the acquired biological information to the transport destination by using the transport destination information. The transport destination information indicating the transport destination of the person to be transported is issued, for example, from the control terminal 10 by an operation of the ambulance crew 7. The storage device 22 of the ambulance service support device 2 or the database 6 stores information (e.g., an email address or information relevant to the email address) regarding a destination to which the information is sent, the destination being of a medical institution to which the person to be transported may be transported. The information provision unit 28 transmits the biological information (face image) of the person to be transported by using the information regarding the destination of the medical institution.

The configurations other than the above in the ambulance service support system 1 and the ambulance service support device 2 of the third example embodiment are similar to those of the first or second example embodiment, and description thereof is omitted herein.

The ambulance service support system 1 and the ambulance service support device 2 of the third example embodiment have similar configurations to those of the first example embodiment and can therefore have a similar effect to that of the first example embodiment. The ambulance service support device 2 of the third example embodiment includes the information provision unit 28 and can therefore transmit the biological information (face image) of the person to be transported to the medical institution serving as the transport destination. Therefore, for example, the medical institution serving as the transport destination can prevent mix-ups of accepted patients.

Other Example Embodiments

The present invention is not limited to the first to third example embodiments, and various example embodiments can be adopted. For example, in the first to third example embodiments, the imaging device 4 and the display device 5 are provided in the smart glasses 3. Instead of this, for example, an imaging device and a display device provided in the control terminal 10 may function as the imaging device 4 and the display device 5 included in the ambulance service support system 1.

In the first to third example embodiments, an image of a face is acquired as biological information used to acquire the personal medical information. However, biological information other than the image of the face may be used. In this case, the acquisition device is a device having a configuration for acquiring the biological information in accordance with the biological information and is not limited to the imaging device.

In the first to third example embodiments, the personal medical information is acquired by using biological information. However, for example, a configuration capable of reading the personal medical information from the database 6 by using a digital identification (ID) may be provided on the assumption that, for example, a medical worker desires to browse the personal medical information by using the ambulance service support device 2 with the consent of the person.

In addition to the configurations of the first to third example embodiments, the ambulance service support device 2 may include an inquiry unit 29 as indicated by a dotted line in FIG. 2. The inquiry unit 29 is a functional unit that inquires of a possible medical institution to which the person to be transported (emergency patient) may be transported as to whether transport of the person to be transported is acceptable. For example, the storage device 22 stores, in advance, medical institution contact information data including names of medical institutions capable of accepting emergency patients and contact information of the medical institutions. When the identification unit 25 identifies the personal medical information of the person to be transported, the inquiry unit 29 determines whether a name of the person's regular medical institution included in the personal medical information is included in the medical institution contact information data. Then, in a case where the name of the person's regular medical institution is included in the medical institution contact information data, the inquiry unit 29 inquires of the person's regular medical institution serving as a possible medical institution to which the person to be transported may be transported as to whether transport of the person to be transported is acceptable by a predetermined contact method by using the medical institution contact information data.

Alternatively, the inquiry unit 29 may inquire whether transport of the person to be transported is acceptable by using disease-related information included in the personal medical information of the person to be transported, such as a chronic disease, chronic medicine, and a medical history, and information on a current symptom of the person to be transported. In this case, for example, the medical institution contact information data in the storage device 22 is associated with not only the contact information of the medical institutions but also information on acceptable disease names and addresses of the medical institutions. The inquiry unit 29 has a function of selecting an appropriate medical institution for the person to be transported by using, for example, artificial intelligence (AI) technology on the basis of the disease-related information of the person to be transported, the information on the current symptom of the person to be transported, and information on a location of an emergency transport site.

Alternatively, the inquiry unit 29 may inquire of a possible medical institution to which the person to be transported may be transported, the medical institution having been selected on the basis of bed availability, as to whether transport of the person to be transported is acceptable. In this case, for example, the inquiry unit 29 selects a possible medical institution to which the person may be transported based on a position of the emergency transport site from the medical institution contact information data described above and acquires bed availability of the possible medical institution to which the person may be transported. Then, the inquiry unit 29 inquires of the possible medical institution to which the person may be transported, the medical institution having been determined to have a bed available on the basis of the acquired bed availability, as to whether transport of the person to be transported is acceptable.

Alternatively, the inquiry unit 29 may inquire of a possible medical institution to which the person may be transported, the medical institution having been selected on the basis of a combination of some or all of the regular medical institution, the disease-related information of the person to be transported, the current symptoms, and the bed availability of the medical institution described above, as to whether the person to be transported is acceptable.

The inquiry unit 29 may prioritize and select a plurality of medical institutions to which the person may be transported. In this case, the inquiry unit 29 sequentially inquires of the medical institutions in order of priority until the inquiry unit 29 receives an answer saying that the person to be transported is acceptable in such a way that the inquiry unit 29 inquires of a possible medical institution having the highest priority to which the person may be transported, and, when receiving an answer saying that the person is not acceptable, then the inquiry unit 29 inquires of a possible medical institution having the second highest priority to which the person may be transported.

Upon receipt of an answer saying that the person to be transported is acceptable in response to the inquiry from the inquiry unit 29, the ambulance service support device 2 transmits information on a name and location of the acceptable medical institution to the control terminal 10. Therefore, the ambulance crew is notified of the information on the name and location of the medical institution to which the person can be transported by the display device of the control terminal 10 or the display device 5 of the smart glasses 3 in accordance with a control operation of the control terminal 10.

Figure 8:
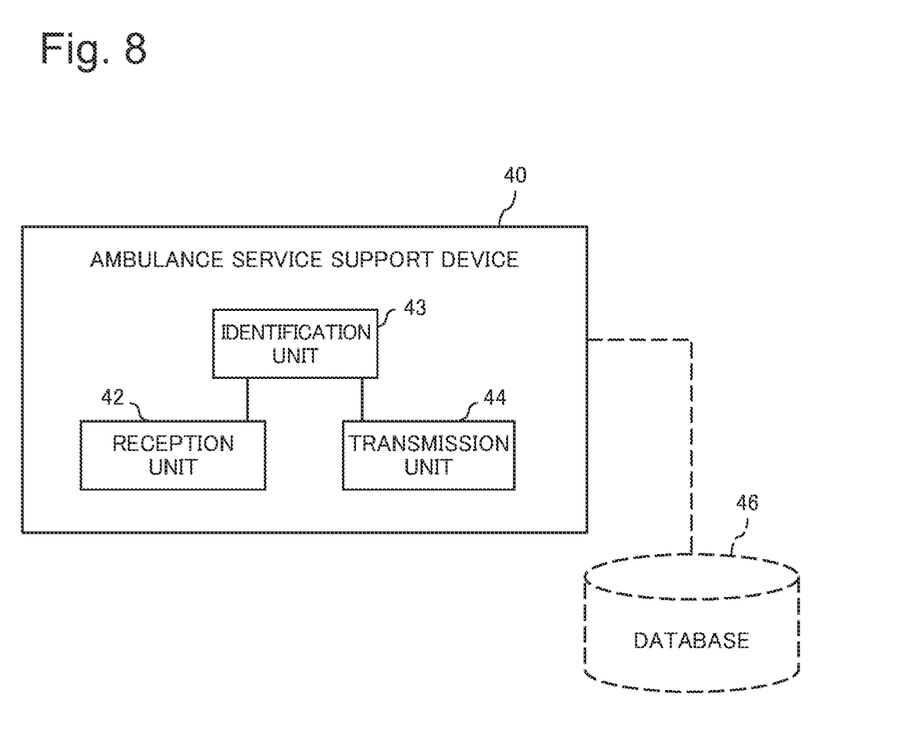
FIG. 8 is a block diagram illustrating an ambulance service support device according to another example embodiment of the present invention.

FIG. 8 is a block diagram illustrating a minimum configuration example of the ambulance service support device according to the present invention. An ambulance service support device 40 is, for example, a computer device and includes a reception unit 42, an identification unit 43, and a transmission unit 44 as functional units. The reception unit 42 receives biological information used for personal identification of a person to be transported. The identification unit 43 identifies personal medical information of the person to be transported by using the acquired biological information in a database 46 storing personal medical information that is personal information regarding medical care including the biological information. The transmission unit 44 transmits emergency support information of which the ambulance crew is to be notified, the emergency support information being based on the identified personal medical information. The reception unit 42, the identification unit 43, and the transmission unit 44 are achieved by, for example, a processor executing a computer program as in the first and second example embodiments.

Figure 9:
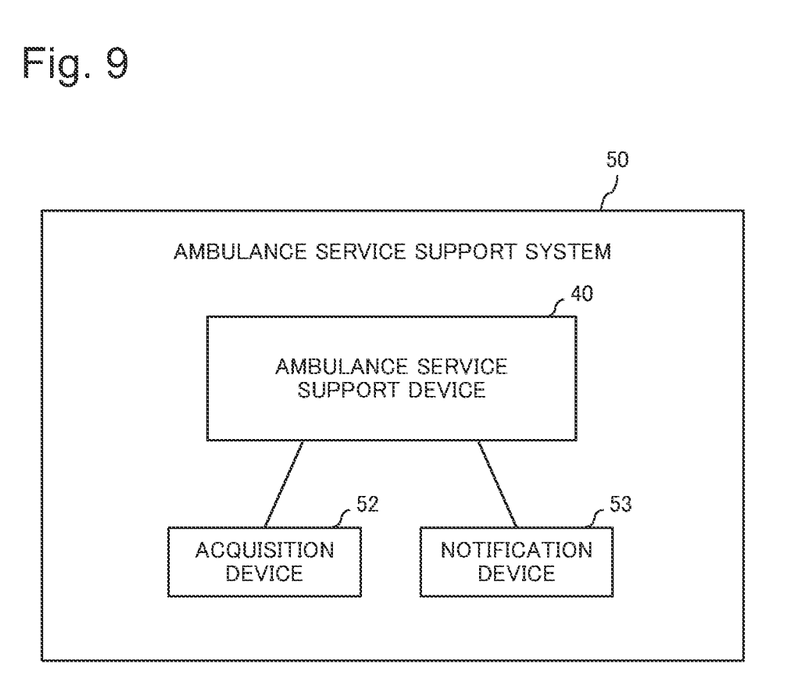
FIG. 9 is a block diagram illustrating an ambulance service support system according to the another example embodiment.

For example, as illustrated in FIG. 9, such the ambulance service support device 40, an acquisition device 52, and a notification device 53 are included in an ambulance service support system 50. The acquisition device 52 is a device that acquires, from the person to be transported, the biological information to be transmitted to the ambulance service support device 40. The notification device 53 is a device that makes notification of the emergency support information transmitted from the ambulance service support device 40.

Figure 10:
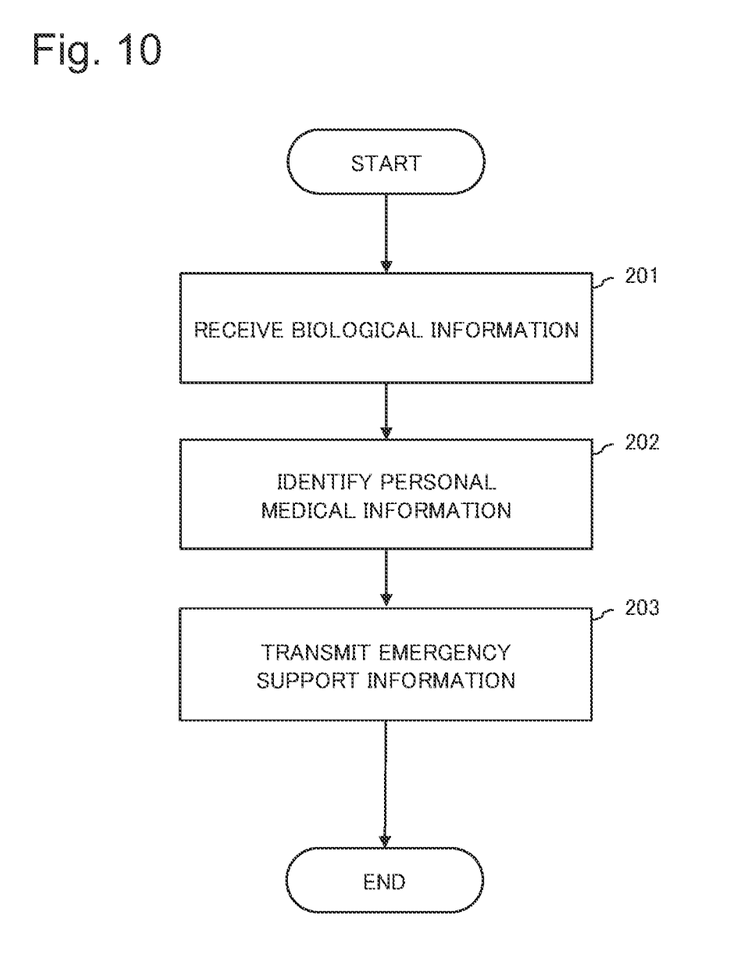
FIG. 10 is a flowchart showing an operation example of the ambulance service support device according to the another example embodiment.

The ambulance service support device 40 executes an operation regarding transmission of the emergency support information as follows. FIG. 10 is a flowchart showing an example of the operation of transmitting the emergency support information in the ambulance service support device 40.

For example, when the reception unit 42 receives biological information to be used for personal identification of a person to be transported (step 201), the identification unit 43 identifies personal medical information of the person to be transported in the database 46 by using the acquired biological information (step 202). Thereafter, the transmission unit 44 transmits emergency support information based on the identified personal medical information (step 203).

With the configuration described above, the ambulance service support device 40 can exhibit an effect of presenting medical information of a person to be transported effective for an ambulance crew at an emergency transport site without increasing time and effort of the ambulance crew.

The previous description of embodiments is provided to enable a person skilled in the art to make and use the present invention. Moreover, various modifications to these example embodiments will be readily apparent to those skilled in the art, and the generic principles and specific examples defined herein may be applied to other embodiments without the use of inventive faculty.

Therefore, the present invention is not intended to be limited to the example embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. An ambulance service support device-system comprising:
    a head-mounted display device configured to be worn by a user;
    a memory storing instructions; and
    a processor configured to execute the instructions to:
        receive biological information of a person, other than the user, to be transported from an acquisition device of the head-mounted display device, the biological information being information to be used for personal identification, the acquisition device being a device that acquires, by a camera of the head-mounted display device imaging the person while the head-mounted display device is worn by the user and directed at the person, the biological information from the person to be transported;
        identify, using a database storing personal medical information, the personal medical information of the person to be transported by using the acquired biological information, the personal medical information being personal information regarding medical care including the biological information;
        transmit emergency support information obtained from the identified personal medical information to a notification device;
        control the head-mounted display device to output a display to the user, the display comprising an elliptical visual field, the elliptical visual field comprising an information display area configured to not overlap a view of the person by the user through the head-mounted display device, the view of the person being arranged at a portion of the elliptical visual field moreso inside of the elliptical visual field than the information display area, and the information display area displaying at least part of the emergency support information to the user of the head-mounted display device;
        acquire one or more of information about a regular medical institution of the person to be transported, disease-related information of the person to be transported, a current symptom of the person to be transported, and information about bed availability of a candidate medical institution to which to potentially transport the person;
        determine whether a name of the regular medical institution of the person to be transported is included in the acquired information; and
        contact and inquire the regular medical institution as to whether transport of the person to the regular medical institution is acceptable, wherein usage of the biometrical information of the person to identify the personal medical information of the person permits the personal medical information to be identified even when the person is unable to provide other identification information on which basis the personal medical information is identifiable and when the other identification information is otherwise unavailable.

2. The ambulance service support system according to claim 1, wherein
    the biological information is facial information.

3. The ambulance service support system according to claim 1, wherein
    the emergency support information includes a plurality of pieces of notification information having different priorities of notification; and
    the processor is further configured to sequentially transmit the pieces of notification information in descending order of priority.

4. The ambulance service support system according to claim 1, wherein
    the personal medical information includes information on an emergency contact destination, and
    the processor is further configured to, upon receipt of an instruction to contact the emergency contact destination, transmit a notification that indicates a state of the person to be transported to the emergency contact destination.

5. The ambulance service support system according to claim 1, wherein
    the processor is further configured to execute the instructions to, upon receipt of transport destination information indicating a transport destination of the person to be transported, transmit the acquired biological information to the transport destination by using the transport destination information.

6. An ambulance service support method executed by a computer and comprising:
    receiving biological information of a person, other than a user of a head-mounted display device configured to be worn by the user, to be transported from an acquisition device of the head-mounted display, the biological information being information to be used for personal identification, the acquisition device being a device that acquires, by a camera of the head-mounted display device imaging the person while the head mounted display is worn by the user and directed at the person, the biological information from the person to be transported;
    identifying, using a database storing personal medical information, the personal medical information of the person to be transported by using the acquired biological information, the personal medical information being personal information regarding medical care including the biological information;
    transmitting emergency support information obtained from the identified personal medical information to a notification device;
    controlling the head-mounted display device to output a display to the user, the display comprising an elliptical visual field, the elliptical visual field comprising an information display area configured to not overlap a view of the person by the user through the head-mounted display device, the view of the person being arranged at a portion of the elliptical visual field moreso inside of the elliptical visual field than the information display area, and the information display area displaying at least part of the emergency support information to the user of the head-mounted display device;

acquiring one or more of information about a regular medical institution of the person to be transported, disease-related information of the person to be transported, a current symptom of the person to be transported, and information about bed availability of a candidate medical institution to which to potentially transport the person;

determining whether a name of the regular medical institution of the person to be transported is included in the acquired information; and contacting and inquiring the regular medical institution as to whether transport of the person to the regular medical institution is acceptable, wherein usage of the biometrical information of the person to identify the personal medical information of the person permits the personal medical information to be identified even when the person is unable to provide other identification information on which basis the personal medical information is identifiable and when the other identification information is otherwise unavailable.

7. A non-transitory storage medium storing a computer program executable by a computer to perform processing comprising:

receiving biological information of a person, other than a user of a head-mounted display device configured to be worn by a user, to be transported from an acquisition device, the biological information being information to be used for personal identification, the acquisition device being a device that acquires, by a camera of the head-mounted display device imaging the person while the head-mounted display device is worn by the user and directed at the person, the biological information from the person to be transported;

identifying, using a database storing personal medical information, the personal medical information of the person to be transported by using the acquired biological information, the personal medical information being personal information regarding medical care including the biological information;

transmitting emergency support information obtained from the identified personal medical information to a notification device;

controlling the head-mounted display device to output a display to the user, the display comprising an elliptical visual field, the elliptical visual field comprising an information display area configured to not overlap a view of the person by the user through the head-mounted display device, the view of the person being arranged at a portion of the elliptical visual field moreso inside of the elliptical visual field than the information display area, and the information display area displaying at least part of the emergency support information to the user of the head-mounted display device;

acquiring one or more of information about a regular medical institution of the person to be transported, disease-related information of the person to be transported, a current symptom of the person to be transported, and information about bed availability of a candidate medical institution to which to potentially transport the person;

determining whether a name of the regular medical institution of the person to be transported is included in the acquired information; and contacting and inquiring the regular medical institution as to whether transport of the person to the regular medical institution is acceptable, wherein usage of the biometrical information of the person to identify the personal medical information of the person permits the personal medical information to be identified even when the person is unable to provide other identification information on which basis the personal medical information is identifiable and when the other identification information is otherwise unavailable.

8. The ambulance support system according to claim 1, wherein the head-mounted display device comprises smart glasses, and wherein the smart glasses are configured to output the display comprising the elliptical visual field in at least one lens of the smart glasses, and wherein an outer edge of the information display area is positioned in the display at a space away from an edge of the elliptical visual field.

* * * * *